US005772221A

United States Patent [19]
Daley

[11] Patent Number: 5,772,221
[45] Date of Patent: Jun. 30, 1998

[54] SKATE BRAKE

[76] Inventor: Peter A. Daley, Box 851587, Steamboat Springs, Colo. 80488

[21] Appl. No.: 560,966

[22] Filed: Nov. 20, 1995

[51] Int. Cl.[6] .............................. A63C 17/14; F16D 55/18
[52] U.S. Cl. ........................ 280/11.2; 280/11.22; 188/17; 188/72.4
[58] Field of Search .............................. 188/17, 26, 72.4, 188/170, 71.1, 151 R; 280/11.2, 11.22, 11.19

[56] References Cited

U.S. PATENT DOCUMENTS

| | | |
|---|---|---|
| 920,848 | 5/1909 | Eubank, Jr. . |
| 926,646 | 6/1909 | Eubank, Jr. . |
| 1,402,010 | 1/1922 | Ormiston . |
| 1,497,224 | 6/1924 | Ormiston . |
| 2,179,592 | 11/1939 | Goettie . |
| 4,108,451 | 8/1978 | Scheck, Sr. ............................. 280/11.2 |
| 4,275,895 | 6/1981 | Edwards ................................ 280/11.2 |
| 4,943,075 | 7/1990 | Gates .................................... 280/11.2 |
| 5,117,957 | 6/1992 | Latsko ................................ 188/170 X |
| 5,171,032 | 12/1992 | Dettmer ................................ 280/11.2 |
| 5,211,409 | 5/1993 | Mitchell et al. ...................... 280/11.2 |
| 5,226,673 | 7/1993 | Cech ..................................... 280/11.2 |
| 5,280,930 | 1/1994 | Smathers et al. .................... 280/11.2 |
| 5,286,043 | 2/1994 | Tkaczyk ............................... 280/11.2 |
| 5,312,120 | 5/1994 | Wiegner ............................... 280/11.2 |
| 5,316,325 | 5/1994 | Mitchell et al. ...................... 280/11.2 |
| 5,320,367 | 6/1994 | Landis .................................. 280/11.2 |
| 5,330,207 | 7/1994 | Mitchell .............................. 280/11.2 |
| 5,340,131 | 8/1994 | Smathers et al. .................... 280/11.2 |
| 5,351,974 | 10/1994 | Cech .................................... 280/11.2 |

*Primary Examiner*—Peter M. Poon
*Attorney, Agent, or Firm*—Hoffman, Wasson & Gitler

[57] ABSTRACT

A brake actuator is provided which utilizes either a mechanical or fluid actuation mechanism. The fluid is transferred from an activation reservoir through a tube to an expansion chamber which activates an extendable piston of the brake. The fluid is contained in a closed system and may be biased to a non-braking state so that the wheels will automatically return to their freely rotating state without any further action by the skater after braking. The upper reservoir fits between the liner surrounding the users calf and the back of the skate. The lower reservoir is positioned adjacent the mechanical braking mechanism. The lower reservoir is biased so that the fluid returns to the upper reservoir and the brake is deactivated. A buffer can be provided around the upper reservoir to assure even flow through the reservoir and tube and to create a compressible environment. The buffer helps to prevent inadvertent braking and to provide control of the degree of braking. In a mechanical embodiment a piston moves into the expansion chamber.

20 Claims, 5 Drawing Sheets

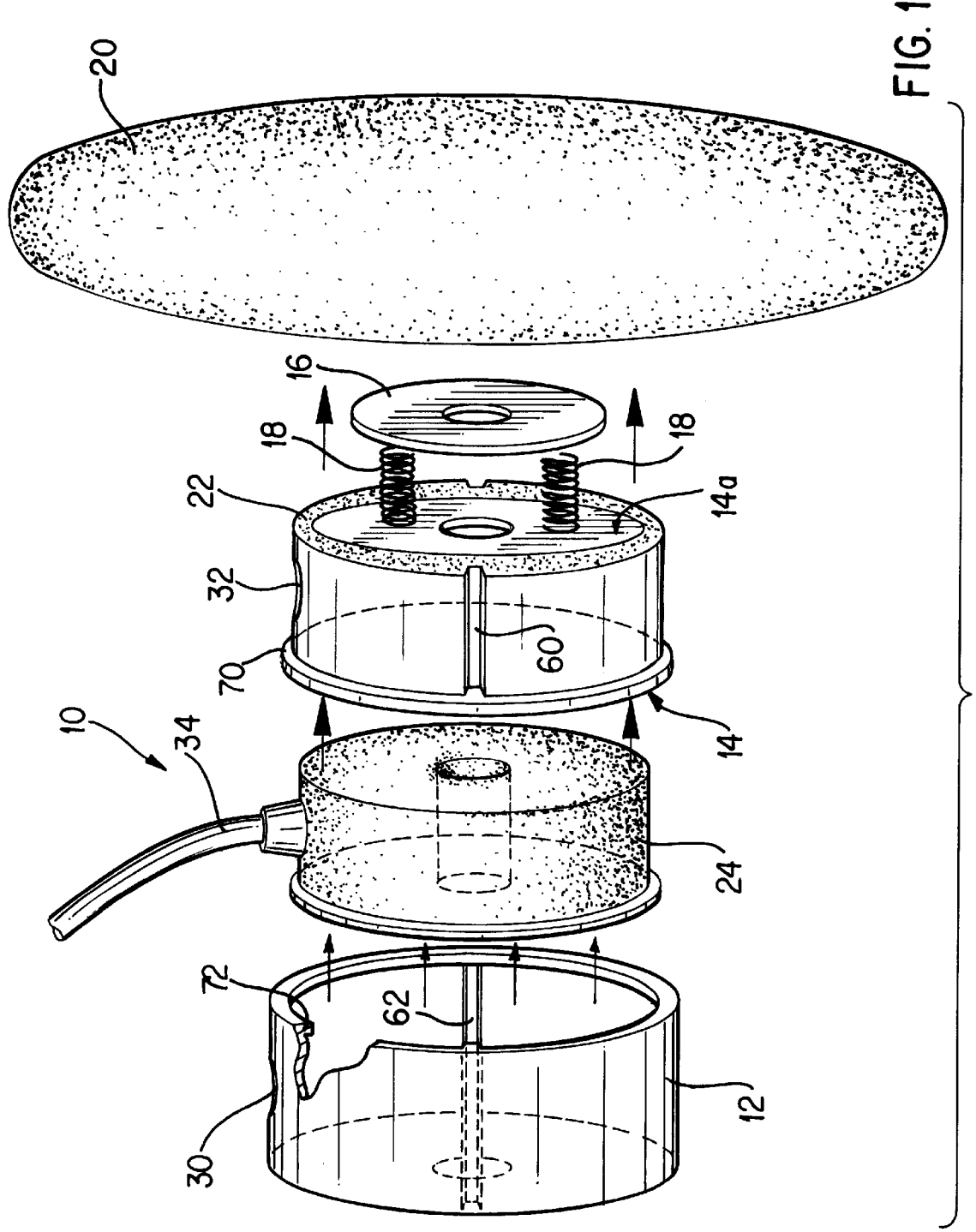

SKATE BRAKE

BACKGROUND OF THE INVENTION

1. Field of the Invention

The present invention relates to a skate brake. More particularly, the present invention relates to a skate brake which is mounted adjacent the hub of a skate wheel and moves parallel to the axis of the wheel to create friction with a braking surface on the wheel.

2. Description of the Prior Art

As the popularity of in-line skating has increased, the number of inexperienced skaters has also risen, and that rise has brought with it an increase in the number of injuries. A major cause of injury to inexperienced skaters is the lack of a positive braking mechanism. Experienced skaters have mastered the abilities necessary to stop their skates by dragging a toe, heel or side of the skate. Such an action requires the skater to lift all or a portion of one skate off of the ground, resulting in less stability. Since a less experienced skater wants to maximize his or her stability, an alternative way of braking, not requiring the skater to take a skate off of the ground, is desired.

A number of positive braking devices have been developed to answer this need. For example, U.S. Pat. No. 5,226,673 to Donald Cech discloses a disc braking mechanism for the rear-most wheel of an in-line skate. Similarly, U.S. Pat. No. 5,316,325 shows an in-line skate brake in which a brake shoe is pivotally connected to the rear wheel so that the shoe contacts the ground to thereby create friction and slow the skater. Other patents illustrate brakes where a mechanism is provided for contacting the outside of one or more or the wheels to create friction between the brake and the wheel(s).

In these systems the practice of dragging of a portion of the skate against the ground is replaced or assisted by a mechanical, positive brake mechanism. However, the foregoing brake systems are overly complex. The systems require a large number of parts and significant labor to assemble. Both of these factors contribute to an increase in the cost of the skate and the likelihood of failure. In addition, the motions required to activate the brake are sometimes awkward. Furthermore, brakes which contact the outer surface of the wheel, the same surface that rolls on the ground, can decrease the life time of the wheel.

While most brake mechanisms are activated by mechanical means, some systems have air pressure activation systems and some form of hand controlled device to develop sufficient air pressure. Such air pressure activated systems, however, have a complicated construction, and there is a delay between the initial activation and braking while air pressure builds to a sufficient level. Furthermore, the system requires some way to release the air after braking.

SUMMARY OF THE INVENTION

The foregoing and other deficiencies of the prior art are addressed by the present invention which is directed to a skate brake which can be activated by a fluid or mechanical activation system. My copending patent application Ser. No. 08/382755, now abandoned, discloses a fluid activation system which is compatible with the skate brake of the present application and is incorporated herein by reference. However, the skate brake of the present application can be activated by other mechanical means and is not intended to be limited to the fluid activation system of my copending application.

The skate brake has an extendable piston located within a rigid outer cylinder. The cylinder pair is mounted adjacent a skate wheel about an axis of the wheel. Pressure applied by the skater, either by fluid or mechanical means, forces the extendable piston to expand. The rigid outer cylinder forces the extendable piston to expand toward the skate wheel. A braking surface is provided on the side of the wheel facing the brake. Both of the braking surfaces on the wheel and the extendable piston can have a similar brake lining material. The extendable piston and outer cylinder are equipped to resist rotation about the axis of the wheel caused by the wheels rotation. The expandable piston may be biased, if necessary, to a non-braking state so that the brake will automatically return to its non-braking state without any further action by the skater after a period of desired braking.

It is an object of the present invention to overcome the deficiencies of existing braking systems.

Another object is to provide a skate brake which is relatively inexpensive to build and install.

Yet another object of the present invention is to provide a skate brake which provides braking by contact of a brake pad with a braking surface on the side of the wheel.

Still another object of the present invention is to provide a skate brake which can be activated by either fluid or mechanical activation means.

Another object of the present invention is to provide a skate brake which can be retro-fitted to existing skates and can be used with a wide variety of existing wheels.

BRIEF DESCRIPTION OF THE DRAWINGS

FIG. 1 is an exploded perspective view of a skate brake according to the present invention;

DETAILED DESCRIPTION OF THE INVENTION

Figure 2C:
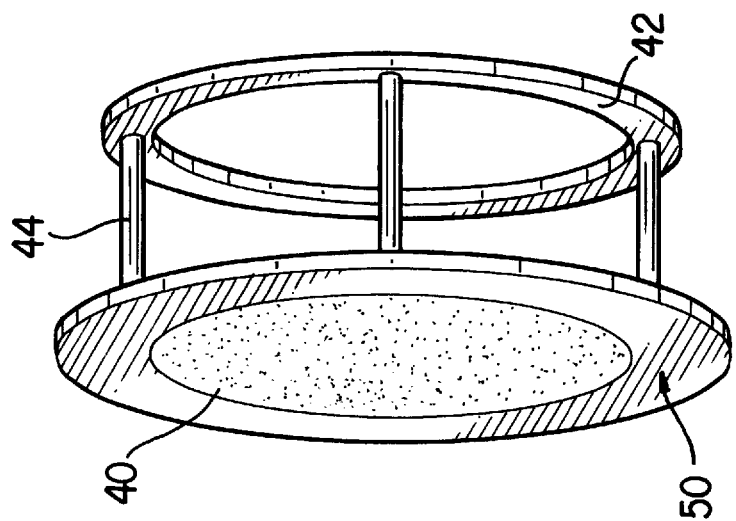
FIGS. 2a–2c are a side view, a planar view and a perspective view, respectively, of a braking surface for mounting to a wheel.

Referring to FIG. 1, the skate brake 10 of the present invention includes an outer rigid directional chamber 12, and an extendable piston 14. A brake rotor 16 is disposed between the wheel 20 and the extendable piston 14 and may support a biasing device 18, which is a pair of coil springs in the illustrated embodiment. Other biasing devices can be employed such as a leaf spring or the biasing device may be eliminated if the extendable piston returns to a non-extended state without assistance. The biasing device ensures that the brake 10 only engages the wheel 20 when a braking force is applied. The extendable piston 14 has a brake pad 22 on the circumference of face 14a, for engagement with a braking surface, shown in FIGS. 2a14 2c, discussed below. The brake pad 22 may be made from rubber, wool ceramic material, or similar substance. The brake rotor 16 must be sized so that the entire surface area of the brake rotor 16 contacts the brake pad 22.

The embodiment shown in FIG. 1 is a fluid actuated brake, and has a bottom reservoir 24 interposed between the outer rigid directional chamber 12 and the extendable piston 14. The outer rigid directional chamber 12, extendable piston 14, brake rotor 16, and bottom reservoir 24 all have openings for accommodating the axle (not shown) of the wheel 20. It is intended that the brake 10 will be mounted on the skate truck adjacent the wheel 20, with the axle extending through the brake 10.

The outer rigid directional chamber 12 surrounds the bottom reservoir 24 to control and focus the direction of extension of the piston 14 toward the wheel 20. An opening 30 is provided in the outer circumferential surface of the outer rigid directional chamber 12, and an opening 32 is provided in the outer circumferential surface of the extendable piston 14 to accommodate a fluid line 34, which connects to the bottom reservoir 24. Similarly, the opening 32 is provided in the outer circumferential surface of the extendable piston 14 to accommodate the fluid line 34, and must be large enough to provide access to the reservoir 24 during full expansion.

In the illustrated embodiment the brake pad 22 is supported by the extendable piston 14, which is made of rigid material. However, the brake pad 22 can be mounted directly to the bottom reservoir 24.

It is difficult to get an idea of the size of the brake 10 from FIG. 1. The outer rigid directional chamber 12 has a diameter of approximately 16 mm and a width of 2 mm. The bottom reservoir 24 is slightly smaller in diameter than the outer rigid directional chamber 12. The width of the reservoir expands from approximately 16 mm when it is deflated to approximately 24 mm when it is fully expanded. The resistance ring 16 has a minimum thickness of 1mm and a diameter of 12 mm.

Figure 2B:
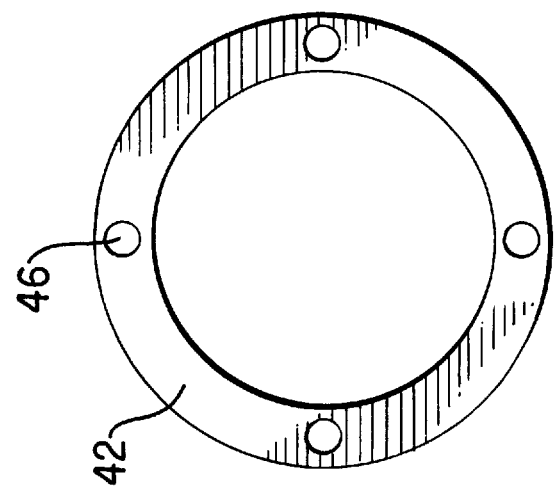
Figure 2A:
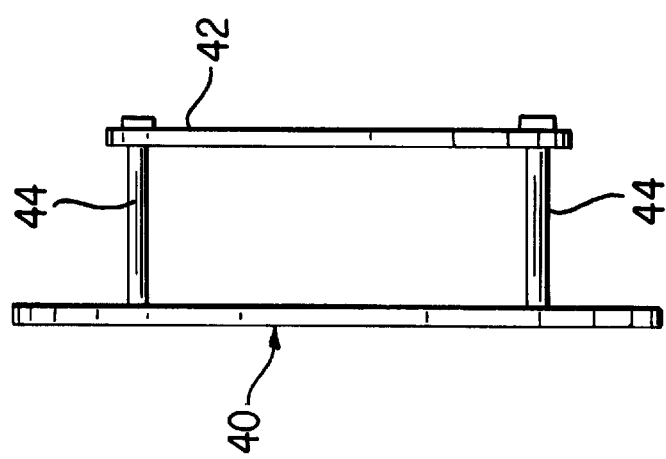

Referring to FIGS. 2a14 2c, the wheel mounted brake surface 40 is illustrated. The brake surface 40 is intended to be adaptable to any hub hole pattern, and may have slots to dissipate heat buildup. The braking surface 40 is placed on the side of the wheel 20 facing the brake 10, and a retention ring 42 is placed on the opposite side of the wheel 20. The braking surface 40 and the retention ring 42 are interconnected by retention posts 44, which fit through the hub of the wheel 20. The retention ring 42 has holes 46 for accommodating the retention posts 44, as shown in FIG. 2b. The braking surface can be removed and reattached to a different wheel during interrotation of the wheels or reversal of the wheels, which is done to ensure even wearing of the wheels.

The braking surface 40 has a braking ring 50 around the circumference for engagement with the brake pad 22. The braking ring 50 can be made from metal, or an alloy thereof, or an abrasive braking material. The size of the ring depends on the size of the wheel and the size of the wheel hub. The braking surface 40 and the corresponding braking ring 50 can be made to extend over the sidewall of the wheel 20, but not be attached to the wheel.

At least two retention posts 44 hold the braking surface 40 on the wheel 20 to provide even purchase between the braking ring 50 and the hub of the wheel 20. The type of wheel and its hub pattern determines the positions of the posts as well as the thread size and depth.

The outer circumferential surface of the inner expansion chamber 14 can have one or more tracking grooves 60 provided parallel to the axle. The embodiment shown in FIG. 1, has two tracking grooves 60. Corresponding tracking rails 62 are provided on the inner circumferential surface of the outer rigid directional chamber 12. The tracking grooves 60 and tracking rails 62 interfit so that the brake 10 will resist rotating with the wheel 20 during braking.

In operation, pressure is applied to the bottom reservoir 24 which is directed to expand toward the wheel 20 by the outer rigid directional chamber 12. The expansion of the bottom reservoir 24 moves the extendable piston 14 toward the wheel 20 against the resistance supplied by the brake rotor 16 and the biasing coils. The biasing coils can be eliminated if the extendable piston returns to a non-extended state upon release of the pressure to bottom reservoir 24. The braking pad 22 on the extendable piston 14 contacts the braking ring 50 on the braking surface 40 attached to the wheel 20.

The extendable piston 14 has a lip or collar 70 extending radially outward from the outer edge of the circumference of the chamber. The outer rigid chamber 12 has a radially inward extending lip or collar 72, extending from the inner most circumferential edge of the chamber 12. The lips 70 and 72 meet one another, during expansion of the reservoir 24, to limit the range of movement of the extendable piston 14 in the axial direction.

In an alternative embodiment the fluid line 34 can be replaced by a solid plunger which would exert pressure on a closed bottom reservoir 24, which in turn would expand the bottom reservoir in a direction parallel to the axle. Such expansion would move the brake pad 22 into contact with brake surface 40.

Figure 3:
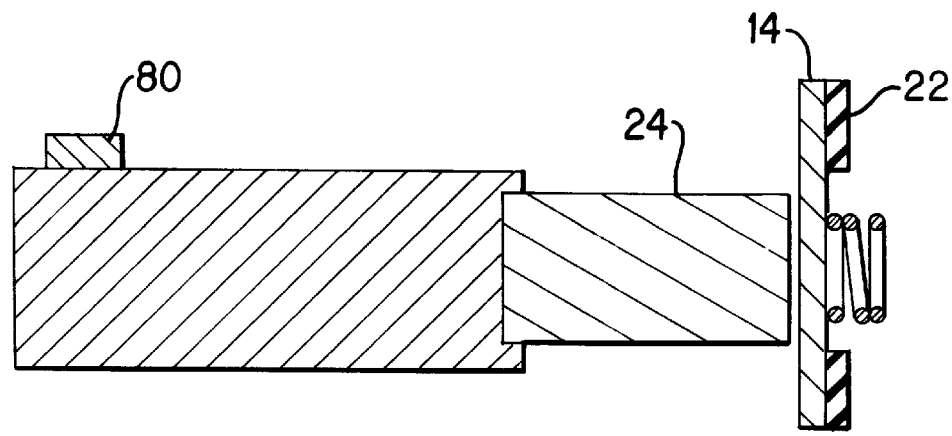
FIG. 3 is a cross-sectional view of a second embodiment of the present invention.

A second embodiment of the present invention is shown in FIG. 3, and has a bottom reservoir 24 same as the first embodiment the bottom reservoir expands to move the extendable piston 14, bearing brake pad 22, toward the wheel 20, as was the case with the first embodiment. Unlike the first embodiment, the second embodiment does not have a fluid line 34 connected to the bottom reservoir 24. Instead, a mechanical device, such as a plunger or piston 80, exerts pressure on the bottom reservoir 24 so that it will expand toward the wheel 20. The bottom reservoir 24 is thus a closed fluid system.

Figure 5:
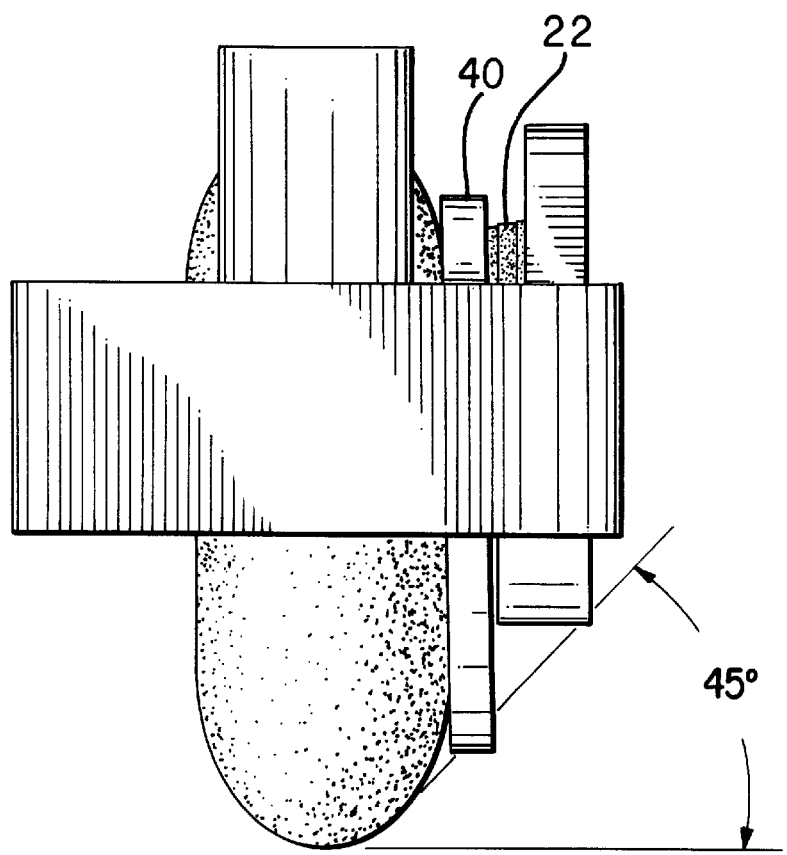
FIG. 5 is a rear view of the skate brake shown in FIG. 4.
Figure 4:
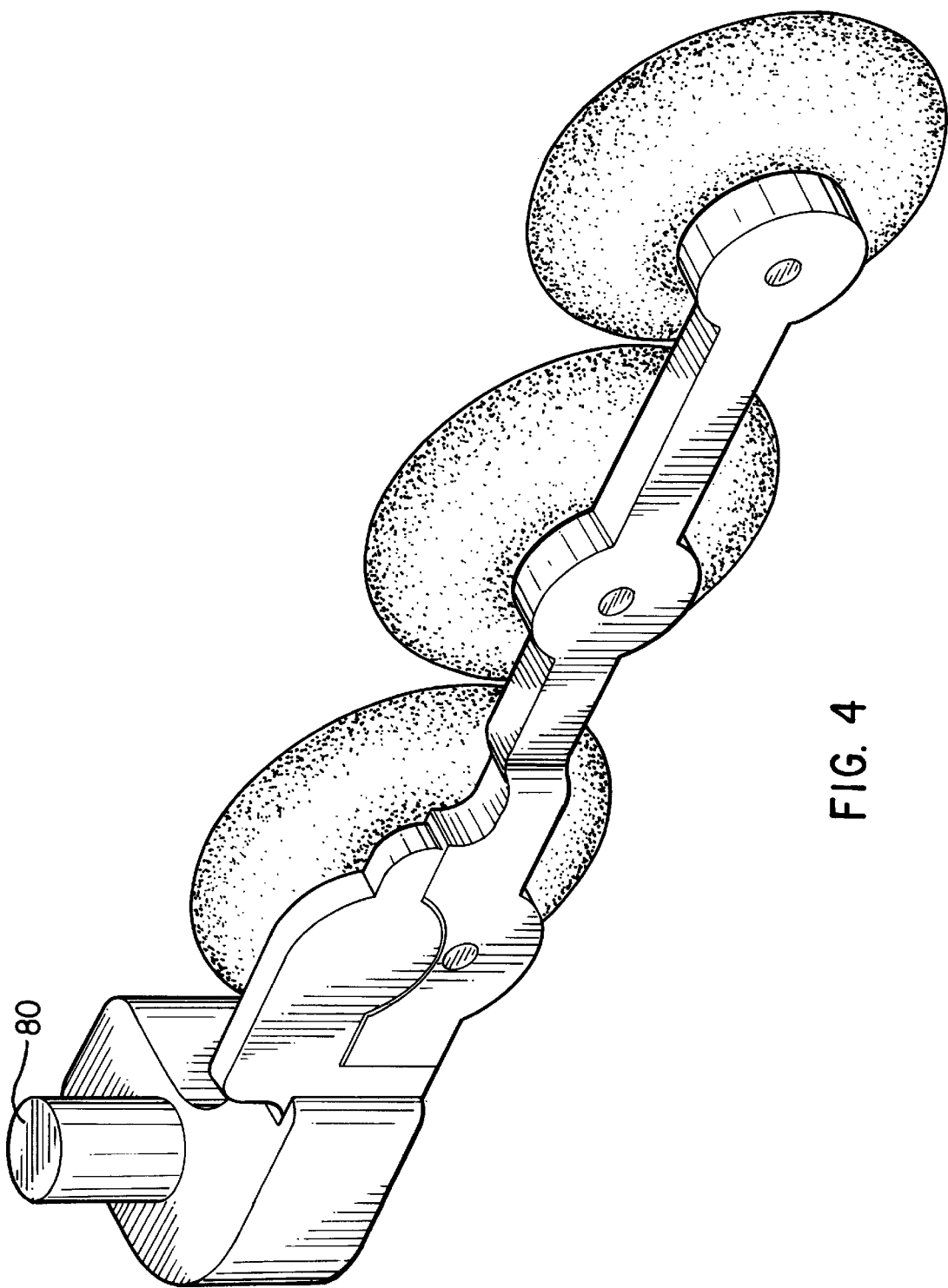
FIG. 4 is a perspective view of the skate brake of the present invention with a three wheel configuration.
Figure 7:
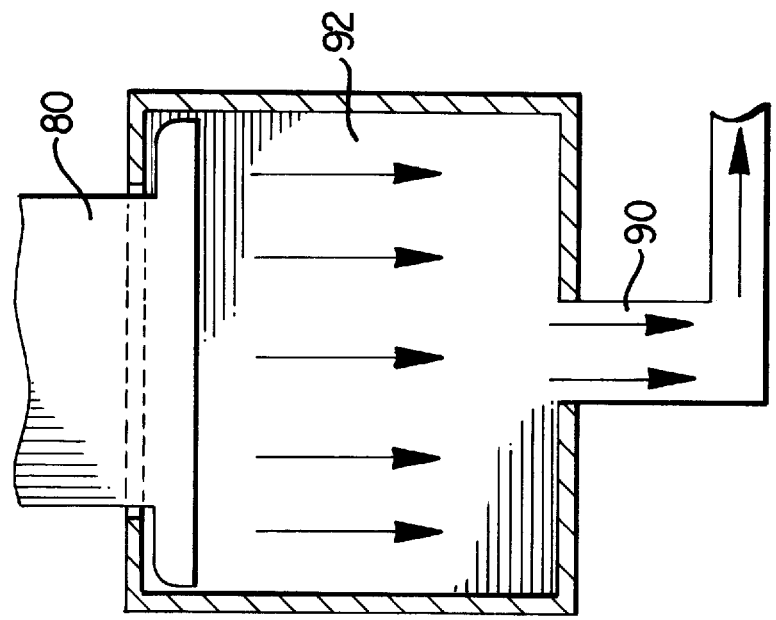
FIG. 7 is a cross-sectional view of a bottom reservoir and secondary or reduced chamber according to the present invention.
Figure 6:
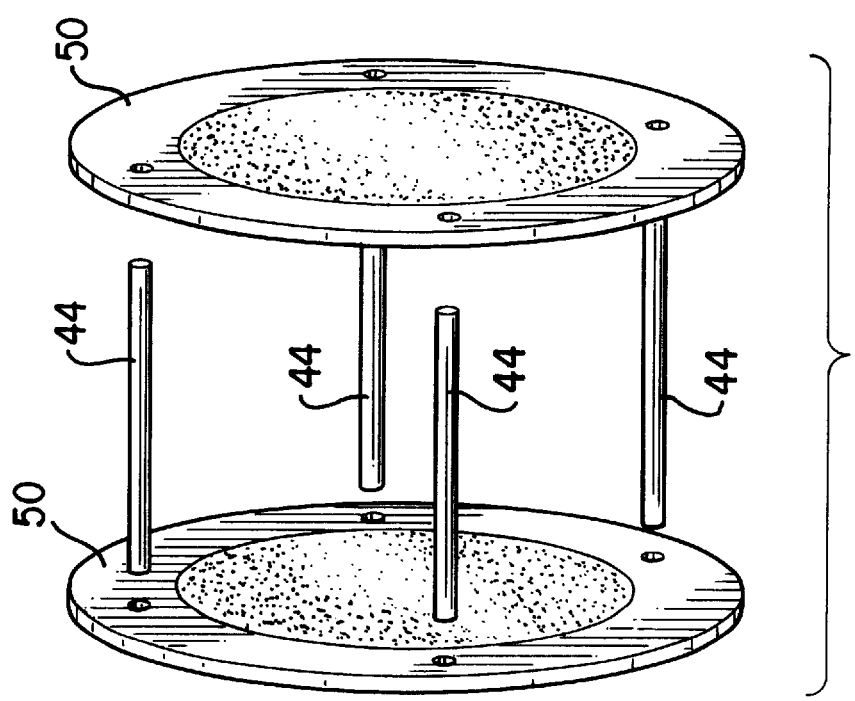
FIG. 6 is a perspective view of a two-sided braking surface for mounting to a wheel.

Referring to FIGS. 4–6, the skate brake 10 is illustrated in a three wheel in-line configuration. The skate brake has a bottom reservoir which is activated by plunger 80. The plunger 80 may be replaced by a piston or a fluid line from an upper reservoir as discussed previously. The pressure applied to the brake pads and the resulting braking force can be multiplied by utilizing a secondary or reduced chamber 90, where the size of the secondary or reduced chamber 90 dictates the multiplication factor as shown in FIG. 7. The weight of pressure is in proportion to the degree of change in size of the secondary or reduced chamber 90. For example, the volume of the secondary or reduced chamber 90 is 50% less than the size of an upper reservoir 92. The force applied to the bottom reservoir 92 will be doubled as it is transmitted from the secondary chamber 90 to the expandable reservoir 24, located downstream, and thereto to the brake pad 22. The degree to which the braking force is increased is controlled by the degree to which the secondary or reduced chamber 90 decreases in size relative to the upper reservoir 92.

The embodiment shown in FIGS. 4 and 5 applies braking force to only one side of the rearmost wheel. The braking surface shown in FIGS. 2a14 2ccan be moved from one wheel to another to permit the wheels to be rotated from one location to another to ensure even wearing. The ring is metal, preferably aluminum, but could be made from rubber or other compounds. The ring has an inner diameter approximately equal to the bearing chase. The ring is secured by posts 44 running through the hub. The positioning of the posts will vary depending upon the type of wheel and the hub pattern, and at least two posts are needed. The brake pad 22 is made from a material, such as rubber or wool ceramic compound, which provides sufficient friction against the brake ring to stop the skate. The brake pad 22 may be a full circle or can be made of multiple segments. The segments may be arcuate. In the embodiment shown in FIGS. 4 and 5, two brake pads 22 are employed, one at the 10 o'clock position and one at the 2 o'clock position. By such a configuration, clearance between the skate and the ground is maximized. As shown in FIG. 4, no part of the skate or the brake 10 extend beyond a line extending outward 45° from the bottom of the wheel. The skater thus has no rubbing between the ground and the skate while pushing off.

FIG. 6 shows a brake ring similar to the brake ring of FIGS. 2a14 2c, however braking surfaces 50 are disposed on both sides of the hub. Skate brakes 10 can be positioned on both sides of the wheel 20 to simultaneously apply braking force to both braking surfaces. The brake pads could be of smaller surface area and still achieve sufficient braking force.

In a related variation, brakes can be provided on both of the two rearmost wheels, or all the wheels. These wheels can have either single or double-sided brake rings. The brake may be connected in parallel to the source of braking force to act simultaneously.

Having described an embodiment of the brake actuation system in accordance with the present invention, it is believed that other modifications, variations and changes will be suggested to those skilled in the art in view of the description set forth above. It is therefor to be understood that all such variations, modifications and changes are believed to fall within the scope of the invention as defined in the appended claims.

What is claimed is:

1. A skate brake, for a skate having multiple wheels comprising:

an extendable reservoir, means for expanding said expandable reservoir, a brake pad attached to said expandable reservoir, and a braking rotor attachable to one of said multiple wheels of said skate brake by means for retaining said rotor to said one of said multiple wheels, said braking rotor being detachable from said one of said wheels and reattachable to another of said wheels upon interchanging of position of said multiple wheels, said brake pad contacts said braking rotor so that said brake pad moves parallel to an axis of said wheel.

2. A skate brake is recited in claim 1, wherein said expandable reservoir is disposed in an outer rigid chamber so that said expandable reservoir expands towards said one of said multiple wheels in a direction parallel to said axis of said one of said multiple wheels.

3. A skate brake as recited in claim 2, further comprising an extendable piston disposed between said expandable reservoir and said brake pad, said extendable piston supporting said brake pad.

4. A skate brake as recited in claim 3, wherein said brake pad is at least one arcuate pad disposed on a surface of said extendable piston facing said braking rotor.

5. A skate brake as recited in claim 2, further comprising an extendable piston disposed between said expandable reservoir and said brake pad, said extendable piston supporting said brake pad.

6. A skate brake as recited in claim 5, wherein said extendable piston has a lip extending radially outward from an outermost edge of said extendable piston, said outer rigid chamber has a radially inwardly extending lip on an innermost edge of said outer rigid chamber, so that a distance said extendable piston can expand toward said wheel has a limit when said outward extending lip contacts said inwardly extending lip.

7. A skate brake as recited in claim 2, wherein said expandable reservoir, and said outer rigid chamber, each, has an opening to fit around an axle of said one of said multiple wheels.

8. A skate brake as recited in claim 1, wherein said expandable reservoir has an opening to fit around an axle of said one of said multiple wheels.

9. A skate brake as recited in claim 1, wherein said braking rotor is attached to a hub of said one of said wheels by retention means extending through said hub to attach to a retaining means, wherein said braking rotor is disposed on one side of said hub and said braking rotor is disposed on an opposite side of said hub.

10. A skate brake as recited in claim 1, further comprising means for biasing said expandable reservoir against an expansion.

11. A skate brake as recited in claim 10, wherein said biasing means is a disc shaped resistance ring having resilient means attached to said resistance ring.

12. A skate brake as recited in claim 11, wherein said biasing means is a spring.

13. A skate brake as recited in claim 11, wherein said resistance ring has a smaller outer diameter than an inner diameter of said brake pad.

14. A skate brake as recited in claim 11, wherein said biasing means is a pair of coil springs.

15. A skate brake as recited in claim 1, further comprising an upper reservoir and a secondary chamber disposed downstream from said upper reservoir, said secondary chamber being connected to said expandable reservoir, said secondary chamber having a smaller volume than said upper reservoir to multiply pressure applied to said brake pad.

16. A skate brake as recited in claim 1, wherein said braking rotor is attached to at least two of said multiple wheels, said brake pad for each of said wheels being moved simultaneously upon initiation of braking.

17. A skate brake comprising:

an expandable reservoir, means for expanding said expandable reservoir, a brake pad attached to said expandable reservoir, a braking rotor attached to a wheel of said skate brake, wherein said brake pad contacts said braking rotor so that said brake pad moves parallel to an axis of said wheel, and an extendable piston disposed between said expandable reservoir and said brake pad, said extendable piston supporting said brake pad, wherein said expandable reservoir, said outer rigid chamber, and said extendable piston, each, has an opening to fit around an axle of said wheel.

18. A skate brake comprising:

an expandable reservoir, means for expanding said expandable reservoir, a brake pad attached to said expandable reservoir, and a braking rotor attached to a wheel of said skate brake, said brake pad contacts said braking rotor so that said brake pad moves parallel to an axis of said wheel, wherein said braking rotor is attached to a hub of said wheel by retention means extending through said hub to attach to a retaining means, wherein said braking rotor is disposed on one side of said hub and said braking rotor is disposed on an opposite side of said hub, and wherein said retention means further comprises at least two bolts.

19. A skate brake comprising:

an expandable reservoir, means for expanding said expandable reservoir, a brake pad attached to said expandable reservoir, and a braking rotor attached to a wheel of said skate brake, said brake pad contacts said braking rotor so that said brake pad moves parallel to an axis of said wheel, wherein said braking rotor is attached to a hub of said wheel by retention means extending through said hub to attach to a retaining means, wherein said braking rotor is disposed on one side of said hub and said braking rotor is disposed on an opposite side of said hub, and wherein said retaining means comprises a second braking rotor disposed on said opposite side of said hub.

20. A skate brake as recited in claim 19, wherein said brake pad further comprises a brake pad on either side of said wheel, said brake pads both being moved by expansion of separate expandable reservoirs.

* * * * *